Oct. 11, 1949.  W. H. D. BROUSE  2,484,551
ADJUSTABLE CONTROL LEVER
Filed May 25, 1945

Inventor
Wm. H. D. Brouse.

UNITED STATES PATENT OFFICE 2,484,551

ADJUSTABLE CONTROL LEVER

William H. D. Brouse, Toronto, Ontario, Canada, assignor to Teleflex Limited, Toronto, Ontario, Canada Application May 25, 1945, Serial No. 595,793

3 Claims. (Cl. 74—522)

This invention relates to improvements in control lever systems such as used on aircraft for propeller pitch governor control and in various other places where accurate adjustment is desired in the flexible operating connections and the principal object of the invention is to provide a means for quickly and accurately altering the operating length of a control lever arm in such a manner that the adjustable member will be securely locked in any adjusted position.

The principal feature of the invention consists in providing the control lever arm with a threaded surface to engage a threaded collar pivotally connected to the control rod and having the pivot bolt engage in interlocking contact with the threaded control lever arm to prevent either longitudinal or rotary movement of the collar thereon after the desired adjustment has been made.

A further important feature of the invention consists in the novel construction of the adjustable members whereby the members are automatically locked in the process of assembly.

In the accompanying drawings—

Figure 4:
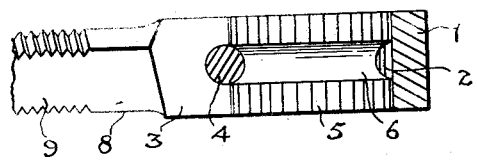
Figure 4 is a horizontal mid-sectional view through the control lever head.
Figure 3:
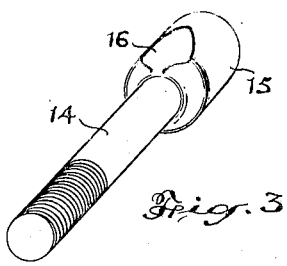
Figure 3 is a perspective view of the interlocking pivot bolt for connecting the operating control rod and the control lever.
Figure 1:
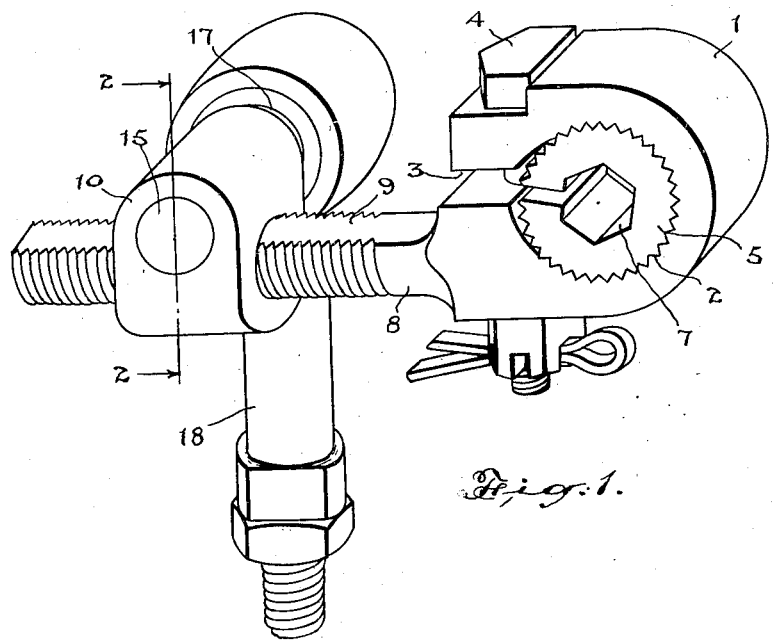
Figure 1 is a perspective view of my improved control lever assembled to the operating control rod.
Figure 2:
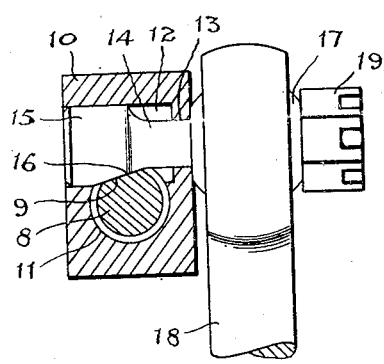
Figure 2 is a vertical elevational view of the pivotal end of the operating control rod and a part sectional and elevational view through the control lever arm and the adjustable sleeve mounted thereon taken on the line 2—2 of Figure 1.

Referring to the accompanying drawings, the control lever comprises a head 1 here shown partly cylindrical in form having a splined cylindrical orifice 2 extending therethrough. A transverse slot 3 divides one side of said head and a bolt 4 is arranged to extend through the portion of the head divided by the slot 3.

A split bushing 5 having a splined peripheral surface to engage the splined surface of the orifice 2 is provided with a circumferential groove 6 through which the bolt 4 extends, thus holding the bushing from accidental disengagement from the head 1. The bushing 5 is provided with a suitable angle-faced orifice 7 to engage the shaft of the control device which the control lever is devised to operate.

Integral with the head 1 and extending from same at one side of the slot 3 is the lever arm 8 which is cylindrical in form having a flat face 9 extending longitudinally thereof. The face 9 is milled in angular relation, preferably an angle of 18° to the axis of the head 1 of the lever.

A collar 10 is formed with a threaded orifice 11 to receive the threaded lever arm 8 and is adjustable thereon and has a cylindrical recess 12 extending partly therethrough and arranged transverse to the threaded orifice 11 which intersects said orifice so that the threaded surface and the angled flat surface 9 extends thereinto when it is mounted on the threaded lever arm.

A small orifice 13 co-axial with the recess 12 extends through the remaining thickness of the collar from the bottom of said recess.

A bolt 14 adapted to extend through the orifice 13 in the collar is formed with a cylindrical head 15 adapted to fit within the recess 12 and the inner end 16 of said head adjacent to the bolt is slabbed at an angle corresponding to the angled flat face 9 of the threaded lever arm and is adapted to wedge tightly against said angled face 9 of the lever arm, thereby locking the collar securely from rotation on the threaded bolt.

The bolt extends through the small orifice 13 in the collar and has mounted thereon a swivel ball bearing 17 of the operating rod 18 and a locked nut 19 secures the ball tightly against the adjacent face of the collar 10.

In operating this lever adjustment it will be understood that the ball 17 when clamped tight against the sleeve is rigidly held and the operating rod swivels thereon. The bolt is drawn into the recess 12 until its bevelled face 16 locks against the bevelled face 9 of the lever arm and a solid connection is made.

When it is desired to make an adjustment of the collar to lengthen or shorten the lever arm length between the operating rod 18 and the control shaft engaged by the lever head, the nut 19 is removed from the bolt and the bolt is withdrawn from the collar. The collar is then turned on the threaded lever arm and when adjusted to the desired position the bolt is replaced in its locking position in contact with the flat face 9 of the lever arm and the locking nut is replaced.

The device is extremely simple but it provides an adjustment for the control lever that is proof against displacement and cannot be altered without being manipulated as described.

The device, as stated, is particularly applicable to propeller pitch governor controls but may be

What I claim as my invention is:

1. A threaded non-rotatable control lever arm adapted to be secured to a device to be controlled and formed with a flattened surface extending longitudinally thereof, a threaded adjustable collar rotatable on said arm, a bolt extending transversely through said collar and engaging in locking contact with said flattened surface to prevent rotation of said collar on said arm and to hold same in adjusted position on said arm, and an operating rod connected to said bolt through a swivel connection.

2. A non-rotatable adjustable control lever arm having a head for engagement with a device to be controlled, said arm being threaded and formed with a longitudinally extending flat surface arranged in angular relation to the head, a threaded collar rotatable on said arm and having a transverse recess intersecting the threaded orifice, a bolt having a head housed in said transverse recess and formed with a bevelled surface to engage in wedging contact with the flat surface of said lever arm to prevent rotation of said collar thereon, and a control operating rod operatively connected to said bolt with a swivel connection.

3. An adjustable non-rotatable control lever arm formed with a head on one end thereof having a transverse axis and adapted for engagement with a device to be controlled, said arm being threaded and formed with a longitudinally extending flat surface arranged in angular relation to the head, a rotatable collar having a threaded orifice to receive said threaded lever arm and an orifice arranged transverse to and intersecting the aforesaid orifice, a bolt extending through said transverse orifice and interlocking with said threaded lever arm to secure the axis of the bolt parallel with the axis of said head and to prevent rotation of said collar, and an operating arm pivotally connected to said bolt.

WILLIAM H. D. BROUSE.

REFERENCES CITED

The following references are of record in the file of this patent:

UNITED STATES PATENTS

| Number | Name | Date |
|---|---|---|
| 545,843 | Bresler | Sept. 3, 1895 |
| 625,150 | Coutchlow | May 16, 1899 |
| 1,986,642 | Milne | Jan. 1, 1935 |
| 2,260,684 | Root | Oct. 28, 1941 |

FOREIGN PATENTS

| Number | Country | Date |
|---|---|---|
| 413,652 | Great Britain | July 17, 1934 |